United States Patent
Rettger et al.

(10) Patent No.: US 11,429,168 B1
(45) Date of Patent: Aug. 30, 2022

(54) SPACE-BASED DATA PROCESSING USING AVAILABLE ENERGY

(71) Applicants: Philip Rettger, San Francisco, CA (US); Robert Matthew Panas, Livermore, CA (US)

(72) Inventors: Philip Rettger, San Francisco, CA (US); Robert Matthew Panas, Livermore, CA (US)

( * ) Notice: Subject to any disclaimer, the term of this patent is extended or adjusted under 35 U.S.C. 154(b) by 0 days.

(21) Appl. No.: 17/238,886

(22) Filed: Apr. 23, 2021

Related U.S. Application Data

(60) Provisional application No. 63/151,316, filed on Feb. 19, 2021.

(51) Int. Cl.
  *G06F 1/26* (2006.01)
(52) U.S. Cl.
  CPC ..................... *G06F 1/26* (2013.01)
(58) Field of Classification Search
  CPC ................... G06F 1/26; H04B 7/185
  See application file for complete search history.

(56) References Cited

U.S. PATENT DOCUMENTS

| | | | | |
|---|---|---|---|---|
| 5,924,015 A * | 7/1999 | Garrison | ............ | H04W 52/343 455/427 |
| 7,925,387 B2 * | 4/2011 | Zheng | ...................... | F03D 9/28 60/39.12 |
| 8,897,769 B2 * | 11/2014 | Miller | ...................... | H04B 7/19 455/12.1 |
| 9,538,538 B2 * | 1/2017 | Zhang | ................ | H04B 7/18543 |
| 2004/0266470 A1 * | 12/2004 | Di Camillo | ........... | H04W 52/52 455/522 |
| 2007/0038534 A1 * | 2/2007 | Canter | ................... | B64G 1/428 705/35 |
| 2010/0193261 A1 * | 8/2010 | Freeman | ................ | B60L 55/00 180/2.2 |
| 2016/0014786 A1 * | 1/2016 | Chang | .................. | H04W 52/34 370/316 |

(Continued)

FOREIGN PATENT DOCUMENTS

WO  WO-2019116375 A1 *  6/2019

OTHER PUBLICATIONS

Andrew Lippman and Ariel Ekblaw. Solar Micro-Mining on the Bitcoin Blockchain. Mar. 9, 2016. (https://viral.media.mit.edu/pub/solarcoin/release/1) (Year: 2016).*

*Primary Examiner* — Zahid Choudhury
(74) *Attorney, Agent, or Firm* — Nath, Goldberg & Meyer; Jerald L. Meyer; Stanley N. Protigal

(57) ABSTRACT

An orbital computation engine is used to provide ancillary computational data processing on an orbital vehicle and is mounted to or integral with the orbital vehicle. A computation circuit receives power from the orbital vehicle and is responsive to power availability from the orbital vehicle to selectively withdraw power for data processing from the orbital vehicle. A communication circuit provides communication with a terrestrial source, and may be a discrete circuit or integrated with the host satellite's communication system. The computation engine withdraws power for data processing from the orbital vehicle and provides the orbital computation engine with available power for ancillary computational data processing from the orbital computation engine's native power supply.

18 Claims, 3 Drawing Sheets

(56) References Cited

U.S. PATENT DOCUMENTS

| | | | | |
|---|---|---|---|---|
| 2019/0193574 A1* | 6/2019 | Roberts | ............. | H02J 7/007182 |
| 2020/0313770 A1* | 10/2020 | Parsons | ................ | H04B 10/118 |
| 2021/0036767 A1* | 2/2021 | Devaraj | ............. | H04B 7/18515 |
| 2021/0314058 A1* | 10/2021 | Lucia | ................. | H04B 7/18513 |

* cited by examiner

SPACE-BASED DATA PROCESSING USING AVAILABLE ENERGY

RELATED APPLICATION

The present Patent Application claims priority to Provisional Patent Application No. 63/151,316 filed Feb. 19, 2021, which is filed by the inventors hereof and which is incorporated by reference herein.

BACKGROUND

Field

The present disclosure relates to the field of energy production and data processing, which is intended to capture and utilize solar energy at altitude, in which the energy is used on board a satellite or other orbital vehicle for computational purposes. More specifically, the disclosed technology relates to the use of power and communication capabilities on a satellite to power computation devices and provide computation functions on the satellite, ancillary to the primary purpose of the satellite.

Background

Computational power involves a computer or other computing device, power to operate the computing device and I/O (input/output). In the case of remote computations, the I/O serves the purposes of communicating computational results.

There are some data processing operations that require intensive use of the computational power and consequently substantial energy expenditure. A well-known example of this is cryptocurrency mining, in which hash calculations are used to maintain the cryptocurrency system and the hash calculations themselves are used to provide fiscal remuneration in the form of the cryptocurrency rewards. Cryptocurrency mining operations can also provide ancillary benefits by supporting blockchain data structures. While in some cases, the energy expenditure requirements are "manufactured", for example for proof-of-work (PoW), these energy expenditures are nevertheless a required part of the data structure. In some data operations used to support PoW requirements for crypto currency, operations are established at locations offering inexpensive electricity supplies. By way of example, estimates in 2018 give Bitcoin power consumption at an upper bound of 7.7 GW, with estimated annual energy consumed in 2018 being 67 TWh (close to the estimated upper bound).

Such calculation requires physical components required for computation. Initially, this was performed by ordinary computers; however, as the computational requirements for cryptocurrency calculations increased, computer video cards became a more economic option than general purpose computers for the rendering of the required computational calculations. More recently, Application Specific Integrated Circuits (ASICs) configured to provide computation capabilities have substantially replaced video cards in this application. The use of ASICs reduces the weight of the electronics used for the specialized computation; however, power supply equipment can still constitute a significant portion of weight involved in the computation equipment.

In the case of satellites, energy is often generated in a manner that provides sufficient power for the satellite's primary functions, for example communication functions. This power is typically provided by solar panels, which are sized to be sufficient to meet the satellite power budget as well as total energy budget via recharging on-board storage batteries. As a result of good engineering practice, there will be a surplus of energy available to the satellite at various times during its operation. A good example of this would be when the satellite is approaching the time when it will enter the earth's shadow and the satellite's solar panels have been both powering full operation and finished storing energy in the on-board storage. Any excess energy produced can no longer be stored in the battery and represents both a necessary engineering margin (to account for later issues such as panel degradation or uncertainty in equipment power draw) as well as a wasted resource in present systems. While this surplus energy may only be available on an intermittent basis, it represents a resource that can be profitably used by certain computer processes that are energy intensive and can accept processing interruptions without significant loss of value. Cryptocurrency mining is one such application.

SUMMARY

An orbital computation engine is used to provide ancillary computational data processing on an orbital vehicle. The orbital computation engine is mounted to or integral with the orbital vehicle, and comprises a computation circuit, a connection on the computation circuit receiving power from the orbital vehicle and a control circuit responsive to power availability from the orbital vehicle and capable of selectively withdrawing power for data processing from the orbital vehicle. A communication circuit capable of receiving data from a transmitting terrestrial source and providing computation results to a receiving terrestrial source is used, and may be a discrete circuit or integrated with the host satellite's communication system. The computation engine is capable of selectively withdrawing power for data processing from the orbital vehicle and provides the orbital computation engine with available power for ancillary computational data processing from the orbital computation engine's native power supply.

DETAILED DESCRIPTION

Overview

Figure 1:
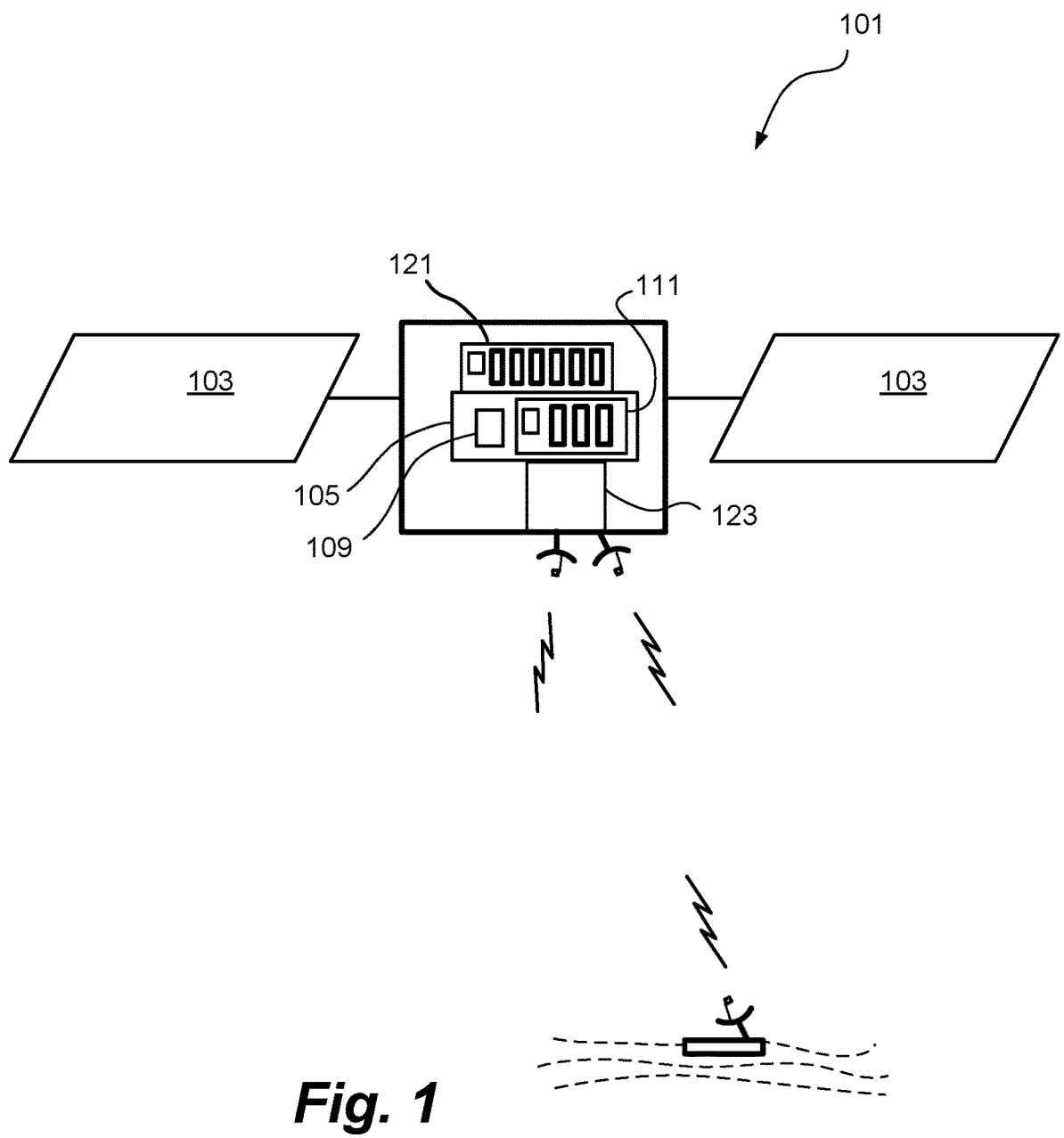
FIG. 1 is a schematic diagram of a satellite having an on-board computation system to use surplus energy available on the satellite.

Computational equipment is provided as part of a payload in a satellite launch, and uses energy locally produced by a photovoltaic collector array. The satellite computational facility receives solar energy and uses a photovoltaic collector array to produce the electricity. Some of this electrical energy is used directly, and some is used to recharge energy storage systems, for subsequent conversion to electrical energy.

Some data processing operations require substantial energy expenditure. According to the disclosed technology, an orbital computational facility uses energy obtained from an orbital computation engine to perform computations. Satellite systems typically include one or more primary functions, such as, by way of non-limiting examples, broadcast transmissions, satellite-to-satellite communications, communication relays between terrestrial locations or on-board scientific or monitoring functions. In order to operate these primary functions, a power supply is provided, which typically takes the form of a solar panel array. Satellites also incorporate navigation systems and satellite operation communication systems. The satellite operation communication may be integrated with a primary satellite function or may be separate, but in either case establishes a communication link with a ground station or another satellite, at least for control of the satellite, but also to transmit data and receive instructions from ground-based stations.

Significantly, the satellite may be designed for primary functions that require substantial amounts of energy. The power draw for these primary functions is likely to be less than the full power output of the primary power source (e.g., solar panel array or nuclear power source). In some cases, this variation in power consumption will be small, but in other cases, the maximum power draw is intermittent or otherwise less than the full output capability of the solar panel array.

A satellite power management system is used to control power and energy provided to consumers on board the satellite. Similarly, in many applications, storage batteries may be part of the power supply, but the total power output of the power supply may still exceed the requirements for the primary functions of the satellite and the need to recharge on-board batteries. If storage batteries are used, the satellite power management system typically provides power to recharge the storage batteries.

In addition to satellite power consumption, it will be necessary to convert power to be suitable for operation of application specific integrated circuits (ASICs) and other electronics used for the computation equipment. This includes the power to run the ASICs, as well as storing data to be transmitted to and from the ASICs, command and control of the ASICs and communication to and from the communication link. ASICS are given by way of non-limiting example, as other circuits having a computation function can be used to provide the desired computations and data processing.

To the extent that suitable power is available on-board the satellite as a part of the satellite's primary function, it is also possible to use circuitry associated with the primary function of the satellite in the operation of the ASICs. Since the power form (voltage, etc.) must be adjusted to be suitable for electronics which are used for the satellite's primary function, it is expected that in a typical satellite, the power will likely already be in the right form (voltage) for ASIC operation. Therefore, the ASIC can likely just be supplied from the main power line without requiring specialized circuitry to convert the power for use with the ASICs.

Additionally, the communication links provided on board the satellite are likely to have unused data capacity, either at off-peak times or as available total capacity. In the case of a communication channel used in communication for operational control of the satellite, the use of a communication channel can be expected to be limited. If the communication channel is part of the primary operation of the satellite, for example as a communication satellite, good engineering practice would require there to be communication capacity in excess of the average requirements of the satellite, to allow for variability in communication demands. This design practice results in some periods when there will be communication capacity unused by the satellite's primary purpose operations. While communication between a satellite and a ground-based receiver is described, it is understood that communication can be through another satellite in appropriate circumstances.

Another critical aspect of use of a satellite is the lift capacity of the launch vehicle. Since ASICs are generally lightweight, it is likely that it will be practical to purchase additional lift capacity within the capabilities of the launch vehicle. Thus, a computation engine may be provided as a separate component of the satellite, whereas the satellite itself provides the power and communication for the computation. The control of power used for computation, and the use of the computation engine to perform data processing operations can be achieved by the computation engine itself, with data concerning availability of power and terrestrial communication availability provided by the satellite's control and communication systems. The control of the computation engine can be discrete from the satellite's primary function or can be controlled by the satellite.

Alternatively, the computation or data processing functions may be provided by the satellite's primary payload, and used to perform the desired auxiliary data computation functions on an "as available" basis.

Concept

A significant part of the concept is that it would apply to any aerial platform, including orbiting satellites (e.g., Starlink), blimps, balloons (e.g., the Google Loon system), as well as proposed high altitude aerial platforms (HARPS).

A good design of these platforms is likely to include solar panels to produce electricity, batteries to provide energy storage, energy conversion and power management systems to coordinate the operation of production, storage and conversion systems, and communication devices that consume the electricity. Electrolysis and hydrogen storage and fuel cells could be an alternative energy storage system providing the same function as an electrochemical battery.

The technique does not require batteries, as the available power can be used instantaneously for calculations, Thus, there is no need to process in any significant quantity during "dark times". The technique may be applied to use the excess energy in the platform for computation. This provides a way to utilize what would otherwise be a wasted resource; necessarily wasted to ensure sufficient engineering margin in the power budget for critical platform operations. Thus, the technique permits intermittency operation. Additionally, the disclosed techniques can be applied whenever the system has excess energy, whether or not the platform has energy storage.

Since one emerging market for orbital platforms is continuous communication services, the solar panels and energy storage systems will have some excess capacity to attempt to eliminate any downtime due to lack of electricity. In practice, such a system would be designed to keep some charge in the batteries at all times and attempt to recharge the batteries to full capacity as much as possible.

Such a system will inevitably have some periods when the batteries are fully charged, during which the solar panels can generate electricity, and the on-board electricity consumers are drawing less electricity than the solar panels are producing. This condition is a natural consequence of a good design, as to do otherwise would risk occasions when the batteries plus the panels are insufficient to operating the satellite's primary systems.

This occasional excess electrical energy can be used to run computer chips for certain applications that allow for process interruptions. Since the cost to produce all the electrical energy for the platform is integral with the cost of the platform's "base service" the occasional excess electricity is free. The platform design could be modified to provide further excess energy if the business plan for above-the-cloud ("ATC") computation is compelling. In this case, the cost to add power is marginal since the platform is providing other services that justify its operation. Consequently, the orbital computing business proposition lies in comparing the value of computation produced at altitude, as compared to the marginal cost to place computation and potentially extra power production into the orbital platforms.

Some examples of uses are cryptocurrency mining, crowd-sourced computing, cloud computation, and code breaking. It is anticipated that other uses would also be implemented.

This configuration allows the computation engine devices placed on the platforms to be as small as "bare chips", since:

a. They can use the existing DC power supply systems present on the orbital vehicle, and avoid the need for an AC to DC power conversion system;

b. Given the platform must be able to dissipate operational-scale heat generation, the ATC devices may fall within the existing heat budget and will not need additional heat dissipation; however, additional heat dissipation can be added as warranted;

c. Housings and cases are not required. Based on analysis of the weight of components of a terrestrial cryptocurrency mining system, the required chipset, without the un-needed components, will eliminate much more than half the weight of a terrestrial crypto miner.

By way of example, one terrestrial cryptocurrency mining computer was deconstructed and the distribution of the weight by function was measured as: 62% power supply, 26% case and cooling fans, with only 12% of the weight as ASIC chips and circuit boards.

Orbital platform commercial lifting services are placing devices in orbit for costs below $5/g, with some reports as low as $2/g. The cost savings of eliminating the above components (existing DC power supply systems, AC to DC power conversion systems; heat dissipation and housings) will substantially subsidize, if not be greater than, the cost of lifting the payload to orbit or aerial platform. This results in computation engine capital costs that are not significantly greater than the cost of a comparable terrestrial system, but with the benefit of marginal or zero electrical operation cost from the occasional surplus electrical energy.

The computation engine system will be able to take advantage of some of the communications bandwidth of the aerial system, and that usage can be scheduled for periods when surplus capacity exists.

In this way, the computation engine additionally becomes a "load balancer" operating only during periods when energy and communications capacity is in surplus, and free, relative to the base system purpose.

Operators of aerial communication platforms may find that the revenues from computation engine additions are sufficient to justify replacing some of the "normal" payload with additional computation engine devices. Each operator will determine, based on the platform configuration, and supported communication business, what capacity of computation engine systems to install.

Implementation of the economic benefits of computation engine configurations will likely lead to finding other applications for further computationally intensive, interruptible computational services.

Features include:

Use of intermittent excess electricity for crypto currency mining or other computationally intensive applications;

The data processing process can suspend, and the communication supporting the data processing function can be suspended, without loss of value of the data onboard the satellite system;

Calculations are done on ASICS or other computer processors which may or may not be dependent on the satellite's processing system;

The disclosed techniques can be used for other computation-intensive activity that can be suspended without loss of information, such as cloud computing processes and code breaking.

Configuration

FIG. 1 is a schematic diagram showing an orbital vehicle such as a satellite 101. Satellite 101 is provided with solar panels 103, which powers various satellite functions and may be used to provide energy for battery storage. Additionally, satellite power management system 109 receives power from solar panels 103 and provides power suitable for operation of electronic used in the satellite's primary purpose system or systems 105. The satellite's primary purpose system or systems 105 include at least one primary computation engine 111.

Carried on board satellite 101 is ancillary computation engine 121, which receives power from satellite power management system 109. Satellite power management system 109 functions as a power supply for consumers in the satellite. and is considered to be the native power supply from satellite 101 because satellite power management system 109 is part of the satellite design configuration for its primary purposes, and is designed to be sufficient to operate the satellite's primary computation engine 111 without consideration of using power supply 109 for operating ancillary computation engine 121. Communication with terrestrial stations is provided by the satellite's communication transceiver 123.

The communication would typically use a radio link that communicates directly with terrestrial stations. Alternatively, the communication may be a radio link that relays communications through an external communication satellite or other external communication link that in turn links with the terrestrial stations.

Satellite 101 also incorporates a control device which provides data regarding availability of power for use by the computation engine 121.

Applications

In addition to use for computational data processing, the platform is usable for a wide range of applications. This system may, by way of non-limiting example, be used for energy harvesting, as described in detail in the energy harvesting operation section. Other uses of the platform include long duration, large payload operations such as surveillance, monitoring, telecommunications.

Figure 2:
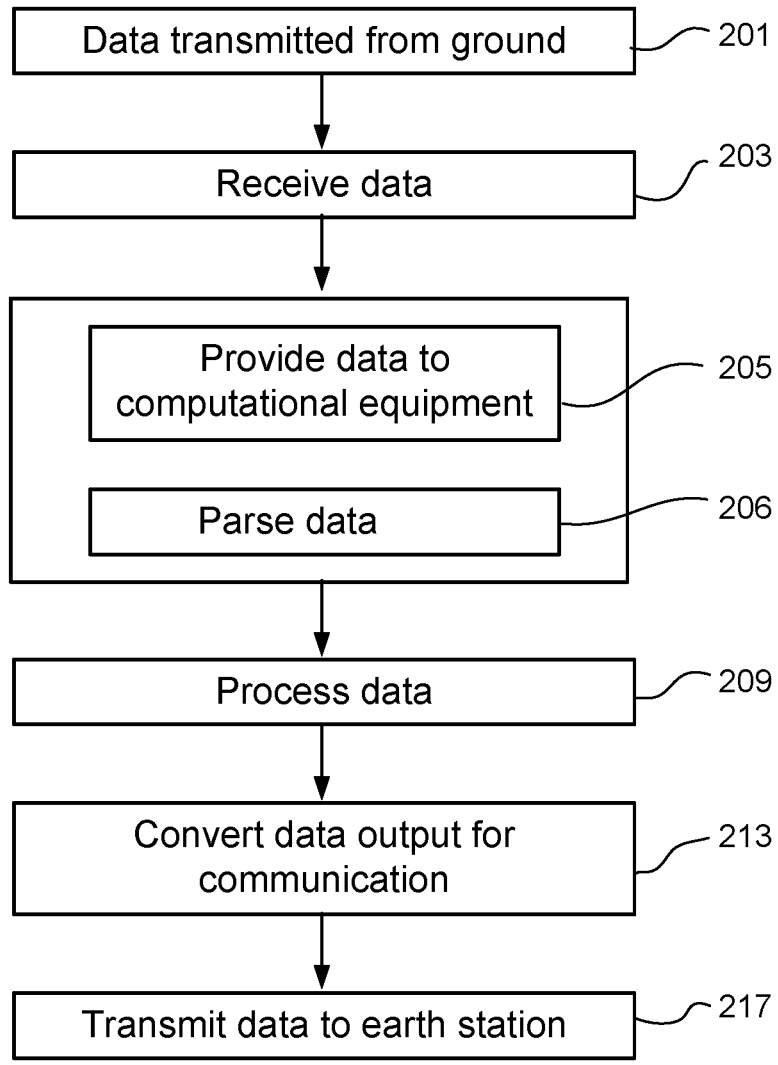
FIG. 2 is a schematic block diagram of the use of the orbital computation engine as a data processing facility.

FIG. 2 is a schematic block diagram of the use of the computation engine as a data processing facility. By way of non-limiting example, cryptocurrency mining is described, but the disclosed techniques can be used for a variety of data processing functions. Data is transmitted from a ground station or other source (step 201) and is received (step 203). This process is as described with respect to data communication, with the received data received by a communication transceiver in the satellite 101. The received data is provided (step 205) to the ancillary computation engine 121 (FIG. 1) and parsed (step 206) either before or after the received data is provided to the computational equipment. The computational equipment then processes the data (step 209).

Figure 3:
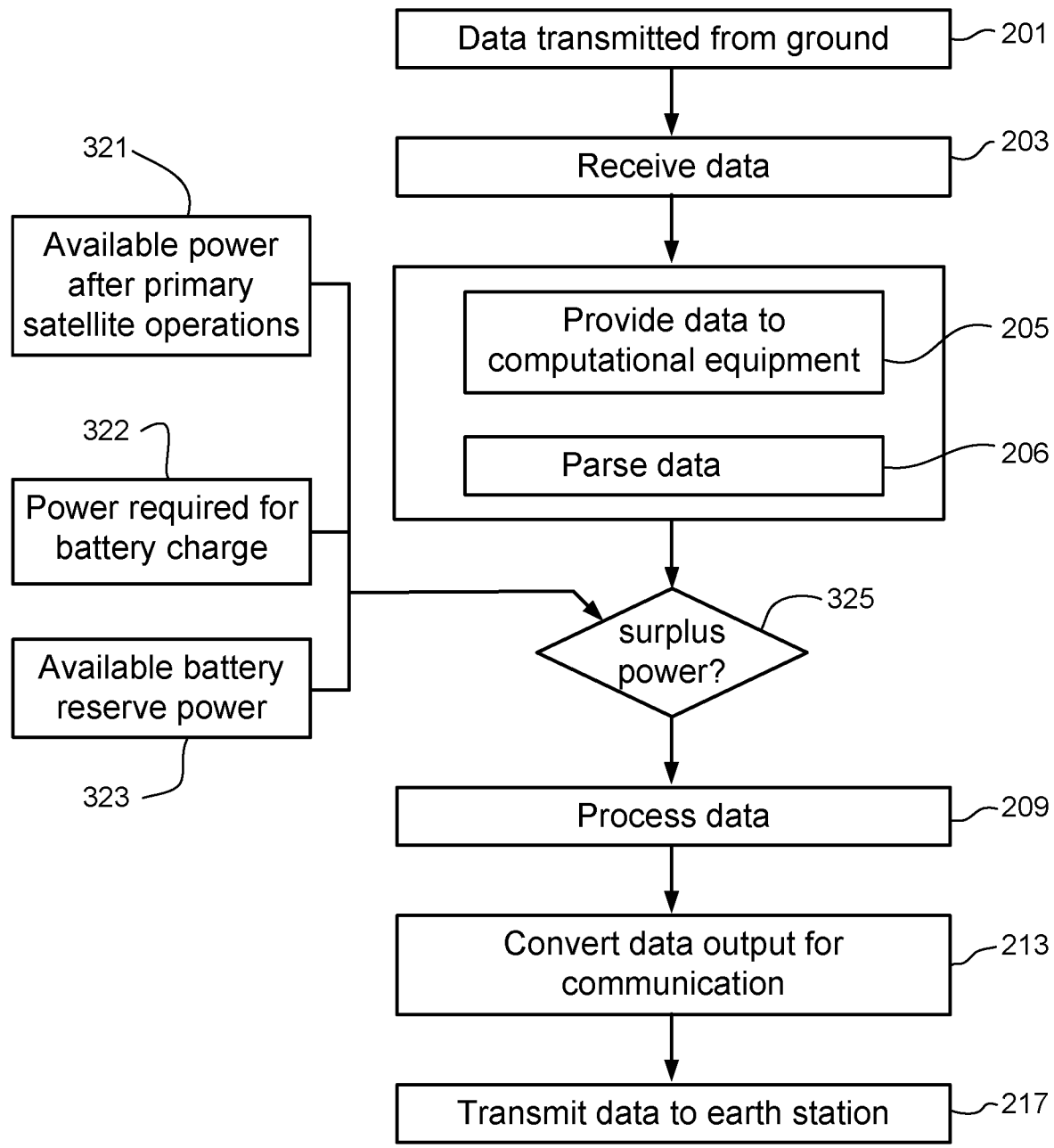
FIG. 3 is a schematic block diagram showing the operation of the computation engine using surplus power.

Advantageously, the ancillary computation engine 121, which receives power from satellite power management system 109 on an "as available" basis using surplus power that would not be used for the satellite's primary purposes. FIG. 3 is a schematic block diagram showing the operation of the computation engine using surplus power. The satellite power management system 109 (FIG. 1) generates indications of available power after primary satellite operations (step 321), power required for battery charge (step 322) and available battery reserve charge (step 323) as power availability data. The power availability data is used in a determination (step 323) of availability of surplus power.

The availability of energy generated by the photovoltaic arrays in solar panels 103 provides an economical source for the energy. By way of non-limiting example, the data processing comprises cryptocurrency mining, in which data is passed through a hash function to provide data processing results as part of the computational services. The data processing output is then converted for communication (step 213), and relayed to the earth station (step 217).

While communication with an earth station is described, the communication can be relayed to another orbital computation engine or to a satellite. Likewise, for implementations other than cryptocurrency mining, the data can be received from sources other than an earth station. By way of non-limiting example, the data can be the product of space exploration, with the data processing applied to the space exploration data.

While an orbital vehicle is described, it is also contemplated that the described techniques can be applied to non-orbital outer space vehicles, such as platforms traveling to the Moon or planets.

CLOSING STATEMENT

It will be understood that many additional changes in the details, materials, steps and arrangement of parts, which have been herein described and illustrated to explain the nature of the subject matter, may be made by those skilled in the art within the principle and scope of the invention as expressed in the appended claims.

The invention claimed is:

1. An outer space computation engine providing ancillary computational data processing, the outer space computation engine mounted to or integral with an outer space or orbital vehicle, the outer space computation engine comprising:
   a computation circuit;
   a connection on the computation circuit receiving power from the outer space or orbital vehicle;
   a control circuit responsive to power availability from the outer space or orbital vehicle and capable of selectively withdrawing power for data processing from the outer space or orbital vehicle; and
   a communication circuit capable of receiving data directly or by relay from a transmitting terrestrial source, processing the data to provide computation results, and providing the computation results directly or by relay to a receiving terrestrial source,
   wherein the capability of said selectively withdrawing power for data processing from the outer space or orbital vehicle provides the orbital computation engine with available power for ancillary computational data processing from the orbital computation engine's native power supply.

2. The orbital computation engine of claim 1, further comprising the computation circuit comprising a separate computation circuit to provide the ancillary computational data processing.

3. The orbital computation engine of claim 1, further comprising:
   the computation circuit comprising one or more primary function computation circuits to provide the primary function computational operations for the outer space or orbital vehicle and primary function computational operations for a primary payload of the outer space or orbital vehicle; and
   the computation circuit comprising a separate computation circuit to provide the ancillary computational data processing,
   wherein the primary function computational operations for the outer space or orbital vehicle and primary function computational operations for a primary payload of the outer space or orbital vehicle have priority of receiving power over power provided to the separate computation circuit to provide the ancillary computational data processing.

4. The orbital computation engine of claim 3, wherein:
   the separate computation circuit comprises application specific integrated circuits (ASICs), the ASICs providing computations or data processing operations in the separate computation circuit.

5. The orbital computation engine of claim 1, further comprising:
   the computation circuit comprising one or more primary function computation circuits to provide the primary function computational operations for the outer space or orbital vehicle and primary function computational operations for a primary payload of the outer space or orbital vehicle; and
   at least one of the one or more primary function computation circuits providing the ancillary computational data processing,
   wherein the provision of the ancillary computational data processing occurs on a "time available" basis secondary to the primary function computational operations for the outer space or orbital vehicle and primary function computational operations for a primary payload of the outer space or orbital vehicle,
   and the use of power for wherein the provision of the ancillary computational data processing occurs on a secondary basis to the use of power over power for the primary function computational operations for the outer space or orbital vehicle and primary function computational operations for a primary payload of the outer space or orbital vehicle.

6. The orbital computation engine of claim 5, wherein:
   at least one of the primary function computation circuits comprises application specific integrated circuits (ASICs), the ASICs providing computations or data processing operations in said at least one of the primary function computation circuits.

7. The orbital computation engine of claim 1, further comprising separate computation means to provide the ancillary computational data processing.

8. An orbital computation engine providing computational data processing, the orbital computation engine mounted to or integral with an outer space or orbital vehicle, the orbital computation engine comprising:
   a computation circuit capable of generating a predetermined category of computation results;
   a connection on the computation circuit receiving power from the outer space or orbital vehicle;
   a control circuit responsive to power availability from the outer space or orbital vehicle and capable of selectively controlling the computation circuit to generate the predetermined category of computation results so as to give priority to a primary function of the outer space or orbital vehicle to use the computation circuit in the use of the computation circuit, thereby using the computation circuit in a manner that does not limit the use of the computation circuit for the primary function of the outer space or orbital vehicle; and a communication circuit capable of receiving data directly or by relay from a transmitting terrestrial source, processing the data to provide computation results, and providing the computation results directly or by relay to a receiving terrestrial source, wherein the capability of said selectively withdrawing power for data processing from the outer space or orbital vehicle provides the orbital computation engine with available power from the orbital computation engine's native power supply in a manner that does not limit the use of the computation engine's native power supply for the primary function of the outer space or orbital vehicle.

9. The orbital computation engine of claim 8, further comprising the computation circuit comprising a separate computation circuit to provide the ancillary computational data processing.

10. The orbital computation engine of claim 8, further comprising:

the computation circuit comprising one or more primary function computation circuits to provide the primary function computational operations for the outer space or orbital vehicle and primary function computational operations for a primary payload of the outer space or orbital vehicle; and the computation circuit comprising a separate computation circuit to provide the ancillary computational data processing, wherein the primary function computational operations for the outer space or orbital vehicle and primary function computational operations for a primary payload of the outer space or orbital vehicle have priority of receiving power over power provided to the separate computation circuit to provide the ancillary computational data processing.

11. The orbital computation engine of claim 10, wherein: the separate computation circuit comprises application specific integrated circuits (ASICs), the ASICs providing computations or data processing operations in the separate computation circuit.

12. The orbital computation engine of claim 8, further comprising:

the computation circuit comprising one or more primary function computation circuits to provide the primary function computational operations for the outer space or orbital vehicle and primary function computational operations for a primary payload of the outer space or orbital vehicle; and at least one of the one or more primary function computation circuits providing the ancillary computational data processing, wherein the provision of the ancillary computational data processing occurs on a "time available" basis secondary to the primary function computational operations for the outer space or orbital vehicle and primary function computational operations for a primary payload of the outer space or orbital vehicle, and the use of power for wherein the provision of the ancillary computational data processing occurs on a secondary basis to the use of power over power for the primary function computational operations for the outer space or orbital vehicle and primary function computational operations for a primary payload of the outer space or orbital vehicle.

13. The orbital computation engine of claim 12, wherein:

at least one of the primary function computation circuits comprises application specific integrated circuits (ASICs), the ASICs providing computations or data processing operations in said at least one of the primary function computation circuits.

14. Method for computing data using an outer space or orbital vehicle provided with a power source and a computation circuit capable of rendering computational results, the method comprising:

supplying power from the power source to the computation circuit, and causing the computation circuit to perform data processing to render the computation results using the power provided;

using a control circuit responsive to power availability from the outer space or orbital vehicle to control the operation of the computation circuit so as to selectively withdraw power for data processing from the outer space or orbital vehicle; and using an on-board communication circuit to receive data from a transmitting terrestrial source and provide computation results from the data processing to a receiving terrestrial source, wherein the capability of said selectively withdrawing power for data processing from the outer space or orbital vehicle provides the orbital computation engine with available power for ancillary computational data processing from the orbital computation engine's native power supply while assigning priority to supplying power to operational control of the outer space or orbital vehicle and a primary payload function of the outer space or orbital vehicle.

15. The method of claim 14, further comprising:

providing, as the computation circuit capable of rendering computation results, a computation engine mounted to or integral with the outer space or orbital vehicle separate from a primary function computational engine for the outer space or orbital vehicle and separately from a primary function computational engine for a primary payload of the outer space or orbital vehicle.

16. The method of claim 14, further comprising:

providing on board the outer space or orbital vehicle with a primary function computational operations for the outer space or orbital vehicle and primary function computational operations for a primary payload of the outer space or orbital vehicle;

providing a separate computation circuit for rendering data processing functions, the separate computation circuit providing the ancillary computational data processing;

using the computation circuit comprising a separate computation circuit to provide the ancillary computational data processing; and providing power control to supply power to the separate computation circuit, wherein the primary function computational operations for the outer space or orbital vehicle and primary function computational operations for a primary payload of the outer space or orbital vehicle have priority of receiving power over power provided to the separate computation circuit to provide the ancillary computational data processing.

17. The method of claim 14, further comprising:
providing on board the outer space or orbital vehicle, a computation circuit comprising one or more primary function computation circuits to provide the primary function computational operations for the outer space or orbital vehicle and primary function computational operations for a primary payload of the outer space or orbital vehicle;
using at least one of the one or more primary function computation circuits to provide the ancillary computational data processing,
wherein the provision of the ancillary computational data processing occurs on a "time available" basis secondary to the primary function computational operations for the outer space or orbital vehicle and primary function computational operations for a primary payload of the outer space or orbital vehicle,
and the use of power for wherein the provision of the ancillary computational data processing occurs on a secondary basis to the use of power over power for the primary function computational operations for the outer space or orbital vehicle and primary function computational operations for a primary payload of the outer space or orbital vehicle.

18. A computer program product for use on an orbital computation engine mounted to or integral with an outer space or orbital vehicle, the computer program product comprising:

a non-transitory computer-readable medium comprising:
- a first instruction to generate a predetermined category of computation results;
- a second instruction to cause a control circuit to respond to power availability from the outer space or orbital vehicle and selectively control the computation circuit to generate the predetermined category of computation results so as to give priority to a primary function of the outer space or orbital vehicle to use the computation circuit in the use of the computation circuit, and thereby using the computation circuit in a manner that does not limit the use of the computation circuit for the primary function of the outer space or orbital vehicle; and
- a third instruction to cause a communication circuit to receive data from a transmitting terrestrial source and to provide computation results to a receiving terrestrial source, wherein the capability of said selectively withdrawing power for data processing from the outer space or orbital vehicle provides the orbital computation engine with available power from the orbital computation engine's native power supply in a manner that does not limit the use of the computation engine's native power supply for the primary function of the outer space or orbital vehicle.

\* \* \* \* \*